Figure 1:
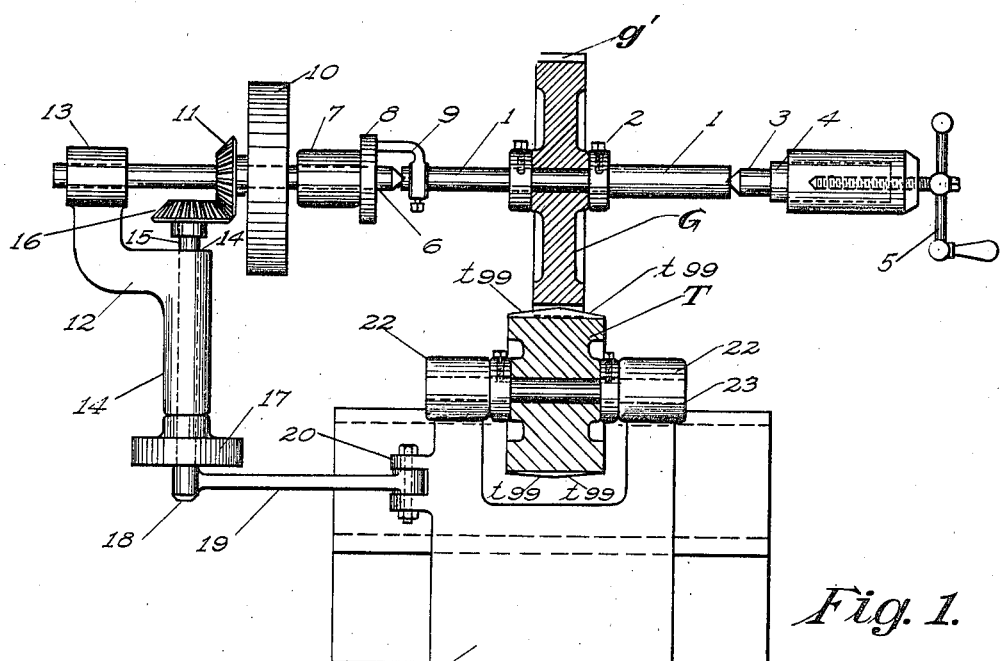
Figure 2:
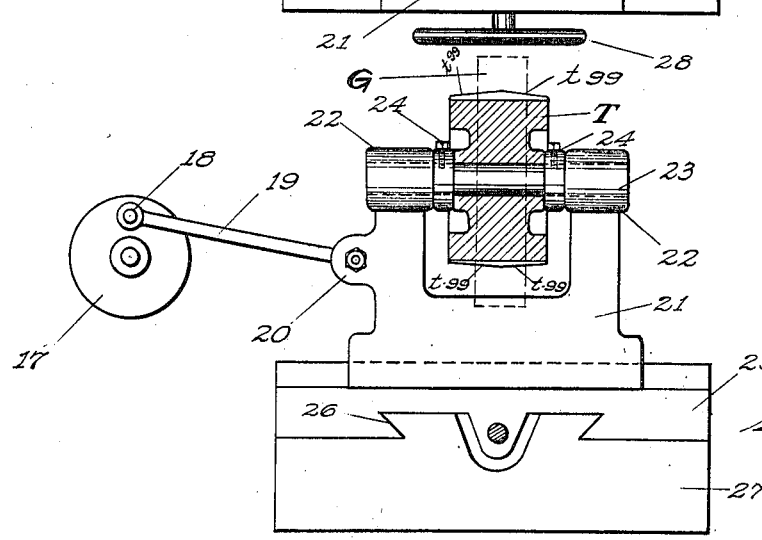

E. J. LEES.
METHOD OF FINISHING GEAR TEETH.
APPLICATION FILED MAY 9, 1914.

1,175,066.

Patented Mar. 14, 1916.
2 SHEETS—SHEET 1.

Witnesses
A. D. Schrader
Edw. Lindemueller

Inventor Ernest J. Lees
By his atty.

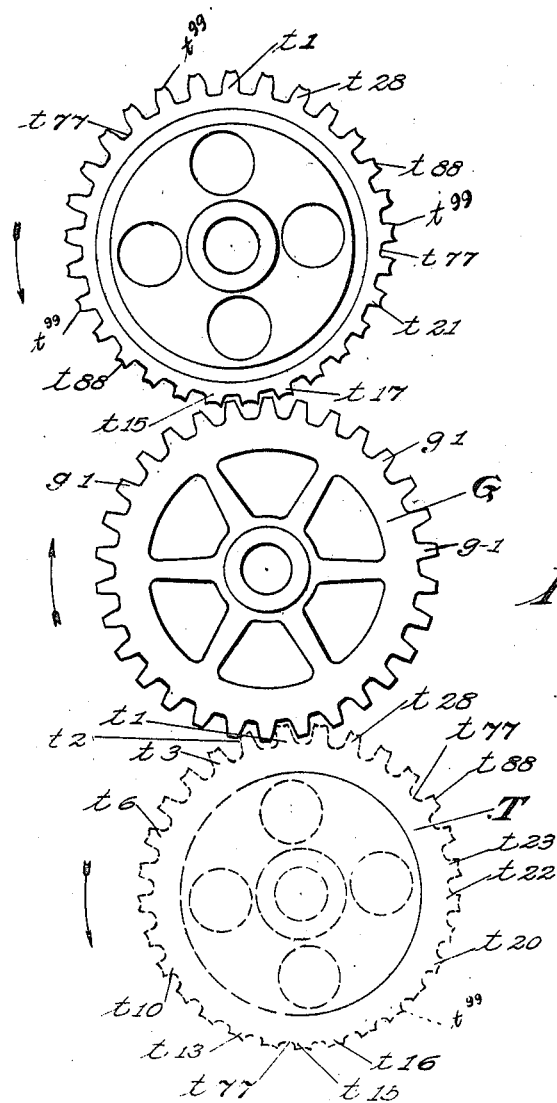

UNITED STATES PATENT OFFICE.

ERNEST J. LEES, OF CLEVELAND, OHIO.

METHOD OF FINISHING GEAR-TEETH.

1,175,066.    Specification of Letters Patent.    Patented Mar. 14, 1916.

Application filed May 9, 1914. Serial No. 837,404.

*To all whom it may concern:*

Be it known that I, ERNEST J. LEES, a citizen of the United States, residing at Cleveland, in the county of Cuyahoga and State of Ohio, have invented a new and useful Improvement in Methods of Finishing Gear-Teeth, of which the following is a specification, the principle of the invention being herein explained and the best mode in which I have contemplated applying that principle, so as to distinguish it from other inventions.

The purpose of this application is to declare as possible and explain a mode of finishing the faces of a gear tooth with such nice precision that the same no longer merely approximates but constitutes, with reference to the tooth with which it is intended to coöperate, a consummation in the art.

I propose to employ a reversing lathe to revolve the toothed wheel having working faces which require finishing while enmeshed with a toothed tool. Some, or preferably all, of the teeth upon the tool I provide with cutting edges, the location and contour of which with respect to its own bore, are adapted to effect a true generating result when presented with a hunting tooth action.

The drawing depicts an involute system of generating action whereby interchangeability is assured. Besides this insurance of a repeating differential for both directions of rotation, I prefer that the teeth on the gear and tool shall not be exact multiples or factors of each other, thereby further lengthening the intervals when the same teeth must come together. My conception next involves a variation from concentricity on the part of the top surfaces of a predetermined number of teeth on the tool. For reasons of speed efficiency merely, my preferred exemplification disposes the top surfaces of all of the cutting teeth on an eccentric curve. In other words, the perimeter of the tool may be in part or entirely eccentric according to a considerable range of selection. The clearance line is in the meantime always mantained concentric. The top surface, moreover, of such teeth as lie along an eccentric curve are depressed to a varying extent though none below the working depth. The teeth which together form the eccentric portions of the tool perimeter are fashioned each with a pair of cutting edges and these may be accentuated by fashioning concavities into their top surfaces. In operation therefore each cutting tooth of the tool removes a certain portion from the opposed faces of two adjacent teeth and thereafter corresponding portions respectively from a different pair of adjacent teeth for each successive revolution. During any particular revolution some other cutting tooth is likewise removing a certain though relatively different portion more or less removed from the pitch line, from a distinct pair of faces. Eventually, as will now be perceived, each cutting edge may have performed an identical operation relative to the pitch line upon corresponding faces of all the teeth. The definite relationship of the several alternate cutting edges as disposed in the eccentric portion of the perimeter of the tool assures overlapping even merging cuts from alternate of the faces, and as shall be further readily understood the fineness of any cut (with an actual burnishing cut as an extreme possible selection) is also dependent upon whatever relative arrangement of the cutting edges may have been determined upon.

My preferred form while illustrating the character of tool best adapted for spur and helical gear work further exemplifies what is perhaps the simplest cam-like form of perimeter. As such it has a continuous uniform progression of approach on the part of the tops of a series of adjacent teeth toward and from the bottom of the working depth.

The inventive conception is associated with means which are hereinafter explained and variously combined in the claims.

While the annexed drawing and particular description thereof, jointly set forth in detail a preferred mode of practising my invention, it should be understood that such mode only exemplifies one of many diversified operative expedients by which the principle of my invention may be justly applied.

Figure I is a diagrammatic plan of mechanism suitable for practising my improved method. Fig. II is an elevation of certain portions of Fig. I. Fig. III is a diagrammatic representation taken through the median plane of the gear and tool, and also showing the tool in dotted lines in a relatively different position.

I now give a list of the advantages which the application of my improved method effects: (1) It assures an absolutely true generating action. (2) The generating action is automatically correct. (3) It absolutely eliminates center troubles and therefore a running of several hours on a jack block such as is required today even in the case of true involute modified gears. (4) The invention precludes a prolongation of error during use since it "trues up" even the slightest errors before use.

The method may be said to make possible the utilization in this particular art of the function of a reamer in making a fine smooth surface with a thousandth of an inch precision. This is accomplished moreover by a series of successive overlapping cuts the coarseness or delicacy of any one of which is automatically determined. The cuts are furthermore made with a double compound shearing action whereby any jump action is overcome, ridges or a step-like result avoided and consequently a perfectly uniform surface-covering burnish attained. The cutting action of my method which when concluded actually approaches a burnishing action is made possible by running two toothed members in mesh with each other in both directions during which time the driving of only one need be and for simplicity preferably is positive. That toothed member which in the drawing is shown as the follower constitutes the tool which is provided with cutting edges eccentrically arranged while its clearance line is concentric. For the simplifying purposes of the present application the cutting edges of the tool are quite arbitrarily arranged along a true eccentric and with uniform spacing relative to the number of teeth to be cut. Any uniform though not necessarily regular progression relative to the pitch line on the part of the cutting edges around a cam-like perimeter will answer provided the work performed by all corresponding edges is progressively overlapping to effect a series of perfectly merging cuts and provided further that no cutting edge is disposed below the working depth, for reasons to be presently made apparent. It is essential that there be a hunting tooth action between the gear to be cut and the tool in order that each cutting edge can eventually contact corresponding faces of all the teeth of the gear to be cut and therefore the cutting edges collectively finish the faces on the gear to be cut along the entire working depth. There is a differential movement, but it is not a continuously fixed differential movement. The drawing exemplifies, again quite arbitrarily, a gear having thirty teeth and a tool having twenty-nine teeth whereby one particular ratio of hunting tooth action is assured. The tool perimeter is furthermore fashioned with a double cone formation, and in Fig. 1 of the drawing each cone surface has a width equal to one-half of the thickness of the tool and equal to exactly the thickness of the gear to be cut. This exemplifying arrangement has been selected because of its simplicity. The tool carrier is capable of being given both a longitudinal and an "in and out" reciprocation. The longitudinal throw should be such as to just bring the lower end of one or the other of the cut slopes to the corresponding edge of the gear, thus insuring a constant mesh.

In view of the statements of the preceding paragraph it should be manifest in what manner the triple compound shearing action of the tool is brought about. (1) There is a longitudinal movement incident to the reciprocation of the tool carrier. (2) Cuts of different depth are made due to the eccentricity of the perimeter of the tool. (3) There is a shearing action due to the cone formation of the cutting edges. In other words, the cutting edges do not strike the gear teeth parallel to the axis as in the modes till now practised. The cone formation in conjunction with the sidewise movement overcomes any jump action and incidentally throws out the cuttings which frequently resemble veritable tinsel. The long rolling movement or constantly varying radial roll also assists in relieving of obstruction by the cuttings. Summing up, it may be said that my invention is based upon a repetition for both directions of rotation of a certain or fixed differential extending over a fixed or given period of time, which period while varying according to the number of teeth on the gear to be cut and those on the tool, is nevertheless for any particular job in positive ratio.

Adverting to the drawings as illustrative largely diagrammatically of one very simple mode of practising my invention, it may be well to state first that I have designated the gear to be cut with the reference letter G and the tool with the reference letter T. The rotation of the gear G is effected by means of the following mechanism, all of which since well known to the art will be very tersely described. An arbor 1 supports a pair of collars 2 which abut opposite sides of the gear G. The arbor is mounted at one end upon the center 3 carried by the tail stock spindle 4 and operated by the screw handle 5. The opposite end of the arbor 1 is mounted upon another arbor 6 carried by the driving spindle 7. A fixed collar 8 and dog 9 insure the necessary rotatory movement. Fixedly mounted upon the center 6 are the pulley 10 and adjacent the same a bevel gear 11. A bracket 12 is provided with a horizontal bearing 13 in which the opposite extremity of the center 6 is mounted, and also a transversely horizontal bearing 14 in which a shaft 15 is mounted. The one extremity of the shaft 15 carries a bevel gear 16 in mesh with the bevel gear 11. The opposite extremity of the shaft 15 projects beyond the other end of the bearing 14 to carry a disk or eccentric 17 having a pin 18 which a rod 19 connects with a yoke 20 upon the tool carrier 21. This carrier comprises a pair of arms 22 extending in the direction of the gear G and provided with alined bearings in which a suitable shaft 23 is carried. The latter properly supports the tool T between a pair of collars 24. The tool carrier 21 is reciprocable longitudinally upon a slide 25 and this latter is in turn movable in and out through the medium of a way 26 fashioned upon a bed 27. The slide 25 is manually reciprocated by the rotation of the band wheel 28 in a manner well known. The arrangement should be such that the tool T is in proper mesh with the teeth $g'$ of the gear G, and as suggested in Fig. II such that the median planes of the gear and tool coincide when the sidewise reciprocation is midway of the limits of its stroke for the reason already mentioned. It is apparent therefore that the positive drive of the gear G is transmitted directly to the tool which may be simultaneously moved in two directions transverse with respect to each other.

Each cutting edge as it approaches the point of the gear tooth with which it must contact for any given revolution, is compelled to follow the radial path prescribed by the true generating action which has been assured by the arrangement of the parts and accordingly effect its shearing cut upon that portion of the particular face with which it is to contact. The measure of the cut is in the meantime automatically determined as earlier stated by the degree of error, however slight, which has become associated with that particular portion of the surface. Thereafter for each successive revolution in a given direction, an edge of one of the conical slopes of the double cutting surface of any particular cutting tooth effects a similar shearing cut, if needed, upon some other of the gear teeth $g'$.

Fig. III well illustrates in full and dotted lines respectively two nearly diametrically opposite positions of the cutter relative to the gear. It will be seen that the cutting teeth have been designated consecutively from $t'$ to $t^{29}$ inclusive. In the two positions shown the two extremities in regard to depth of the cutter teeth are seen in mesh with the gear teeth, and it should be particularly noted that the enmeshing action is constant even during the engaging passage of the cutter teeth which project but slightly beyond the clearance line $t^{77}$ and above the working depth. If desired the cutting edges may be accentuated by grinding a concavity $t^{88}$ therebetween. The conical top slopes to the cutter teeth have both been designated by the reference character $t^{99}$.

In operation, the machinist in charge should let his judgment determine how long it would take to complete one cycle of the differential movement, and thereafter he would reverse the power for an approximately like period of time though sufficient to complete the cycle in the opposite direction. In this manner opposite cutting edges upon the same cutting tooth will contrive to effect most nearly corresponding cuts upon the opposed faces of two adjacent teeth on the gear. It might be well to add that the positive rotation of the gear has been adopted for disclosure in the drawing merely because most convenient in practice.

My invention being thus described with sufficient thoroughness, what I desire to secure by Letters Patent and therefore claim specifically, is:

1. The method of finishing gear teeth which consists in rotating a gear and toothed tool in mesh with each other and cutting opposite faces of the teeth of the former during a predetermined number of automatically successive revolutions in both directions of rotation with a given arrangement of the parts.

2. The method of finishing gear teeth which consists in rotating a blank and tool in mesh and successively making shearing cuts from the faces of any particular tooth at varying distances from the axis of the gear during reversed rotations of both blank and tool.

3. The method of finishing gear teeth which consists in cutting the tooth faces thereof with a compound action of the cutter comprising coördinate movement toward and parallel to the axis of the blank.

4. The method of finishing gear teeth which consists in rotating a tool in hunting tooth mesh with the gear and effecting the simultaneous movement of the tool bodily in a line parallel with the axis of the gear.

5. The method of finishing gear teeth which consists in rotating the gear in mesh with a tool and making oblique cuts from the faces of the teeth in a direction toward the axis of the gear.

6. The method of finishing gear teeth which consists in causing a gear and toothed tool to rotate in mesh with each other in reverse directions with a predetermined mounting, simultaneously imparting an axial movement to the tool, and alternately cutting corresponding portions of opposed faces of the gear teeth during reversed rotations respectively.

7. The method of finishing gear teeth which consists in rotatably mounting a gear and toothed tool in hunting tooth mesh with each other, positively rotating one whereby to drive the other, and simultaneously imparting to one a movement parallel to the axis of the other.

8. The method of finishing gear teeth which consists in rotating a tool in mesh with the gear and making cuts from the tooth faces thereof with a compound shearing action toward and at an automatically varying distance from the axis of the blank.

9. The method of finishing gear teeth which consists in rotating a gear and toothed tool in mesh with each other with a hunting tooth action and making compound shearing cuts from the faces of the teeth.

Signed by me, this 7th day of May, 1914.

ERNEST J. LEES.

Attested by—
MARY COLEMAN,
A. L. SCHLEGEL.